(12) United States Patent
Zeiss

(10) Patent No.: US 11,371,565 B2
(45) Date of Patent: Jun. 28, 2022

(54) JAW-TYPE GEARSHIFT

(71) Applicant: Schaeffler Technologies AG & Co. KG, Herzogenaurach (DE)

(72) Inventor: Tony Zeiss, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 112 days.

(21) Appl. No.: 16/766,561

(22) PCT Filed: Dec. 10, 2018

(86) PCT No.: PCT/DE2018/101005
§ 371 (c)(1),
(2) Date: May 22, 2020

(87) PCT Pub. No.: WO2019/114878
PCT Pub. Date: Jun. 20, 2019

(65) Prior Publication Data
US 2021/0372487 A1    Dec. 2, 2021

(30) Foreign Application Priority Data
Dec. 12, 2017  (DE) ...................... 10 2017 129 602.6

(51) Int. Cl.
| | |
|---|---|
| *F16D 11/14* | (2006.01) |
| *F16D 21/04* | (2006.01) |
| *F16D 23/08* | (2006.01) |
| *F16H 63/20* | (2006.01) |
| *F16D 11/10* | (2006.01) |
| *F16D 23/12* | (2006.01) |

(52) U.S. Cl.
CPC .............. *F16D 11/14* (2013.01); *F16D 11/10* (2013.01); *F16D 21/04* (2013.01); *F16D 23/08* (2013.01); *F16H 63/20* (2013.01); *F16D 2023/123* (2013.01)

(58) Field of Classification Search
CPC .......... F16D 11/10; F16D 11/14; F16D 21/04; F16D 23/02; F16D 23/08; F16H 2063/3093
USPC ................................ 192/48.91, 69.7, 69.71
See application file for complete search history.

(56) References Cited

U.S. PATENT DOCUMENTS 4,181,210 A * 1/1980 Bibbens ................. F16D 11/10
                                                     192/114 T
4,776,228 A   10/1988 Razzacki et al.
(Continued)

FOREIGN PATENT DOCUMENTS

| CN | 1046029 A | 10/1990 |
|---|---|---|
| CN | 1101405 A | 4/1995 |

(Continued)

*Primary Examiner* — Richard M Lorence
(74) *Attorney, Agent, or Firm* — Kevin Parks

(57) ABSTRACT

In a jaw-type gearshift for an at least two-stage gearbox, which is in particular electromotively driven, a ring-shaped shifting gate with a sliding block guide is provided, which has axially protruding shifting jaws and is in shifting contact by means of a shifting finger arranged on the sliding sleeve and engaging in the sliding block guide. In a method for shifting the jaw-type gearshift, the shifting jaws are coupled into corresponding receptacles of the gear wheels in that the shifting gate is moved axially relative to the sliding sleeve and the rise of the sliding block guide.

15 Claims, 2 Drawing Sheets

(56) References Cited

U.S. PATENT DOCUMENTS 9,822,874 B2 * 11/2017 Volpert ................. F16H 63/38
2002/0144563 A1   10/2002 Forsyth
2010/0257969 A1   10/2010 Martin et al.

FOREIGN PATENT DOCUMENTS

| CN | 101765723 A   | 6/2010 |
| CN | 102192249 A   | 9/2011 |
| CN | 107366691 A   | 11/2017 |
| DE | 10101864 A1   | 8/2002 |
| DE | 102012221056 A1 | 5/2014 |
| DE | 102012221065 A1 | 5/2014 |
| EP | 0756098 B1    | 1/1997 |
| EP | 2098742 A1    | 9/2009 |
| JP | S58193128 U   | 12/1983 |
| JP | 2017211055 A * | 11/2017 | ............. F16D 11/14 |
| WO | 2017088961 A1 | 6/2017 |

* cited by examiner

JAW-TYPE GEARSHIFT

CROSS-REFERENCE TO RELATED APPLICATIONS

This application is the United States National Phase of PCT Appln. No. PCT/DE2018/101005 filed Dec. 10, 2018, which claims priority to German Application No. DE102017129602.6 filed Dec. 12, 2017, the entire disclosures of which are incorporated by reference herein.

TECHNICAL FIELD

The disclosure relates to a jaw-type gearshift of a gearbox for coupling an idler gear wheel to a gear shaft by means of a sliding sleeve axially displaceable relative to the gear shaft and a method for shifting the jaw-type gearshift.

BACKGROUND

Gearboxes for electromotively driven motor vehicles or hybrid vehicles with more than one gear have the problem that an interruption in tractive power can occur during a shifting operation. To reduce the interruption in tractive power, jaw couplings can be used, which generally require large pockets for receiving the jaws so that the jaw can engage freely. However, this results in noises, so-called load shocks, which can occur in load change situations. However, noises also occur when shifting, due to the axial stop and during speed adjustment-tangential impact. In addition, high forces are required to insert the jaw.

US 2002/01 44 563 A1 discloses a jaw-type gearshift of a gearbox for coupling an idler gear to a gear shaft and by means of a sliding sleeve that is axially displaceable and rotatably arranged relative to the gear shaft.

US 2010/025 7969 A1 discloses a multi-speed gearbox with a jaw-type gearshift, wherein a sliding sleeve is provided which is axially displaceable on a gear shaft and which can be brought into tooth engagement with jaws of an idler gear which is freely rotatably mounted on the gear shaft by means of the above engagement elements. Here, two engagement elements each engage with little play in a tooth gap provided between the jaws.

EP 2098 742 B1 discloses a multi-speed gearbox with a number of jaw coupling sleeves for connecting freewheel gear wheels arranged on gear shafts, wherein each jaw coupling sleeve can be shifted into five different positions, firstly a neutral position, secondly a locked gear position, thirdly a locked gear position with an unlocked clutch coupling play, fourthly an engaged gear position with a large coupling backlash, and fifthly a position that can be ejected by itself, wherein a friction element is additionally provided which temporarily transmits a moment to the gear wheels when changing gears. The jaws of the sleeves and the freewheel gear wheels are designed to be ejectable, wherein the jaws which can be ejected themselves eject the previous gear when a new gear is engaged.

WO 2017/088 961 A1 discloses a jaw coupling for a drive train of a motor vehicle, wherein a first coupling half has a first jaw element with a locking toothing and a second jaw element which can be rotated relative to the first jaw element and has a flying toothing, and the locking toothing and the flying toothing have different toothing geometries. A second coupling half has a jaw toothing which, together with the flying toothing, engages in toothing gaps formed between the locking teeth of the first jaw element.

SUMMARY

In an example embodiment, the jaw-type gearshift has a ring-shaped shift gate on which the shift jaws are arranged. In addition, flying toothing, in particular selection jaws, is provided which synchronizes the gear wheel to be shifted relative to the shifting gate to such an extent that the shifting jaws can be pushed into the shifting receptacles of the gear wheel without resistance and thus with reduced noise.

In an example embodiment, the shifting gate is arranged to be pivotable about an angle α relative to the sliding sleeve, and the shifting gate is mounted on the gear shaft in a rotationally fixed and axially displaceable manner.

The shifting gate is in shifting contact with a shifting finger of the sliding sleeve pointing radially inward via a sliding block guide.

Axially protruding flying toothings, e.g. selection jaws, engage when shifting a gear wheel first in the receptacles of the gear wheel, which have a multiple large angular length, so that the selection jaws can easily track to adjust a rotational speed of the gear wheel to the rotational speed of the gear shaft.

The gear wheels additionally have receptacles arranged on a smaller diameter for the shifting jaws of the shifting gate, in which the shifting jaws can engage without resistance and thus with reduced noise after the rotational speed adjustment of the gear wheel.

The receptacles may be arranged in an adapter disc connected to the gear wheel and/or directly in the gear wheel.

In an exemplary embodiment, it is provided that the receptacles or pockets are arranged on the idler gears and the jaws on the sliding sleeve or on the shifting gate. Of course, there it is also the option to arrange the receptacles or pockets on the sliding sleeve and the shifting gate and the jaws on the idler gears.

In the method for shifting the jaw-type gearshift according to the disclosure, the sliding sleeve is axially shifted together with the shifting gate until the selection jaws engage in the receptacles of the gear wheel. The shifting gate is pivoted by a shifting angle α relative to the sliding sleeve, whereby, due to the inclination of the gate guide, an axial movement relative to the sliding sleeve is generated, which leads to an engagement of the shift jaws in the receptacles of the gear wheel.

BRIEF DESCRIPTION OF THE DRAWINGS

An exemplary embodiment of the invention is shown in the drawings and is described below. In the figures.

DETAILED DESCRIPTION

Figure 1:
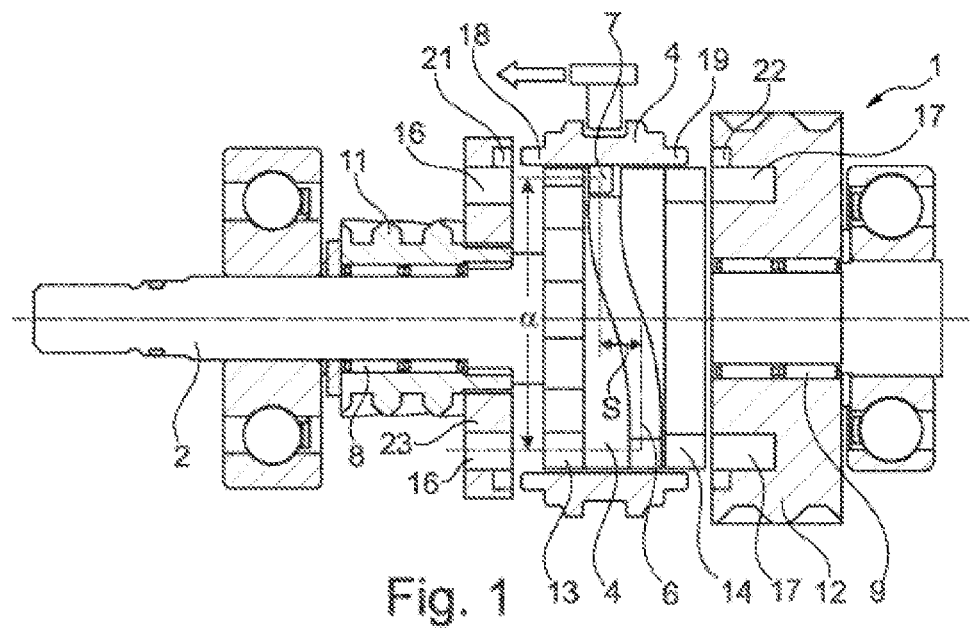
FIG. 1 shows a jaw-type gearshift in a "neutral position" in section in a schematic representation.

According to FIG. 1, a jaw-type gearshift 1 for an at least two-stage gearbox of a motor vehicle, driven, for example, by an electric motor, has a gear shaft 2 and a sliding sleeve 3 which is axially displaceable relative to the gear shaft 2. The sliding sleeve 3 coaxially surrounds the gear shaft 2 and has a ring-shaped shifting gate 4, e.g. in the form of a cylindrical shifting sleeve, in the space between the gearbox shaft 2 and the sliding sleeve 3. The shifting gate 4 is arranged on the gear shaft 2 in a rotationally fixed and axially displaceable manner by means of an internal toothing which engages in an external toothing of the gear shaft 2.

The shifting gate 4 has a sliding block guide 6 on its circumference, which extends over a circumferential angle α (α=e.g. 60 degrees) and has an axial offset (slope) corresponding to the shifting path S.

A radially inward projection 7, e.g. a shifting finger of the sliding sleeve 3 engages in the sliding block guide 6.

On the gear shaft 2, two gear wheels 11, 12 are each freely rotatable on the side of the sliding sleeve 3 by means of floating bearings 8, 9.

The shifting gate 4 has shifting jaws 13, 14 which are arranged on the end face and point in the axial direction and are distributed uniformly around the circumference and can be brought into engagement with corresponding receptacles 16, 17 of the gear wheels 11, 12. The sliding sleeve 3 has end faces in the axial direction, projections 18, 19, e.g. selection jaws, which can be brought into engagement with corresponding receptacles 21, 22 of the gear wheels 11, 12.

The receptacles 21, 22, e.g. pockets in which the selection jaws 18, 19 engage are arranged on a larger diameter D than the receptacles 16, 17 for receiving the shifting jaws 13, 14, which are arranged on a smaller diameter d.

In addition, the receptacles 21, 22 have a width B (angular length) that is several times larger than the selection jaws 18, 19, with a width b (angular length), which is also larger than a width of the shifting jaws 13, 14 and the receptacles 16, 17 for the shifting jaws 13, 14. The shifting jaws 13, 14 are selected to be wide enough that they can interlock positively in the receptacles 16, 17, essentially with a clearance fit.

Figure 2:
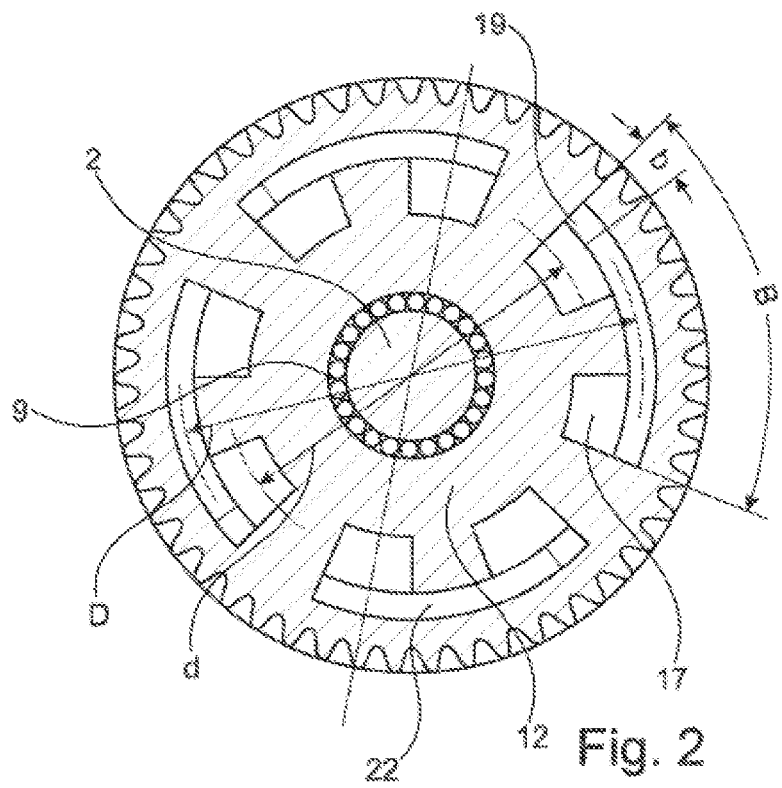
FIG. 2 shows a gear wheel in cross section.
Figure 3:
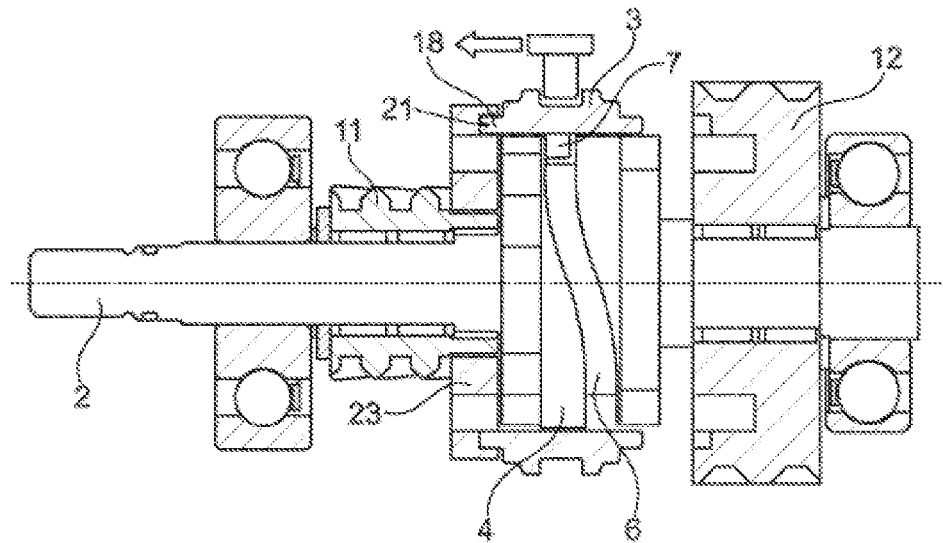
FIG. 3 shows the jaw-type gearshift in a "synchronization position"
Figure 4:
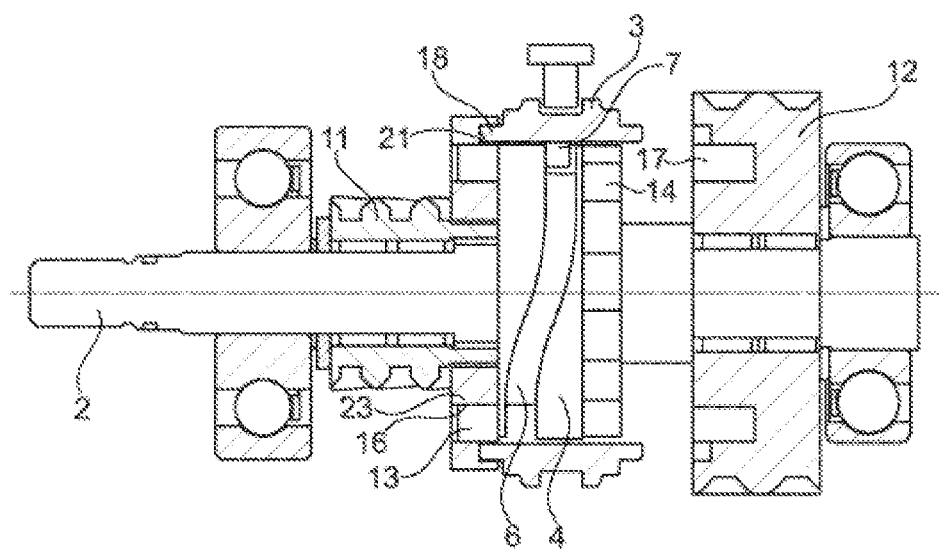
FIG. 4 shows the jaw-type gearshift in a "shifting position".

In the exemplary embodiment according to FIGS. 1 to 3, the receptacles 22 for the selection jaws 19 and the receptacles 17 for the shifting jaws 14 are arranged in the gear wheel 12 and the receptacles 21 for the selection jaws 18 and the receptacles 16 for the shifting jaws 13 are arranged in an adapter disc 23, which is rotatably connected to the gear wheel 11.

In the exemplary embodiment according to FIG. 1, the receptacles or pockets are arranged on the idler gears and the jaws on the sliding sleeve or on the shifting gate; it is also possible to arrange the receptacles or pockets on the sliding sleeve and the shifting gate and the jaws on the idler gears.

When shifting, starting from a second gear stage (gear wheel 12) to a first gear stage (gear wheel 11), for example, the torque on the gear shaft 2 is first momentarily reduced to facilitate pulling the shifting jaws 14 out of the receptacle 17.

Thereupon, the shifting jaws 14 together with the selection jaws 19 are axially displaced into a "neutral position" by means of the sliding sleeve 3. The shifting gate 4 is moved by the shifting finger 7.

In the event of a shifting movement beyond the "neutral position", the selection jaws 18 engage in the receptacles 21 of the gear wheel 11 or the adapter plate 23 and thus bring about a speed adjustment between the gear shaft 2 and the gear wheel 11.

In a final step, the shifting jaws 13 engage in the receptacles 16, in which the shifting gate 4 pivots by an angle α relative to the sliding sleeve 3 and the shifting gate 4, in engagement with the shifting finger 7, is axially displaced by a shifting path S relative to the sliding sleeve 3 by a gradient of the sliding block guide 6.

Of course, with small axial distances, it is also possible to shift the jaw-type gearshift 1 under load. In this case, when the sliding sleeve 3 is actuated, the selection jaws 18 are pushed into the first gear wheel 11 and the shifting jaws 14 are pulled out of undercuts of the second gear wheel 12 by the following angular momentum and the first gear is then engaged directly.

REFERENCE NUMERALS

1 Jaw-type gearshift
2 Gear shaft
3 Sliding sleeve
4 Shifting gate
6 Sliding block guide
7 Shifting finger
8 Floating bearing
9 Floating bearing
11 Gear wheel (first gear stage)
12 Gear wheel (second gear stage)
13 Shifting jaw
14 Shifting jaw
16 Receptacle (13)
17 Receptacle (14)
18 Selection jaw
19 Selection jaw
21 Receptacle (18)
22 Receptacle (19)
23 Adapter disc
α Pivot angle (3-4)
S Shifting path
D Diameter (21,22)
d Diameter (16,17)
B Width (21,22)
b Width (18,19)

The invention claimed is:

1. A jaw-type gearshift for a gearbox comprising:
a gear shaft;
a first gear wheel arranged on the gear shaft;
a second gear wheel arranged on the gear shaft;
a sliding sleeve arranged axially displaceable relative to the gear shaft; and
a ring-shaped shifting gate arranged between the gear shaft and the sliding sleeve, the ring-shaped shifting gate comprising axially protruding shifting jaws.

2. The jaw-type gearshift of claim 1, wherein the ring-shaped shifting gate is arranged to be pivotable about a shifting angle relative to the sliding sleeve.

3. The jaw-type gearshift of claim 1 wherein:
the sliding sleeve comprises a radially inwardly pointing shifting finger; and
the ring-shaped shifting gate comprises a sliding block guide in shifting contact with the radially inwardly pointing shifting finger.

4. The jaw-type gearshift of claim 1, wherein the sliding sleeve comprises axially protruding selection jaws.

5. The jaw-type gearshift of claim 1, wherein:
the first gear wheel comprises a first receptacle for receiving a first selection jaw and a second receptacle for receiving a first shifting jaw; and
the second gear wheel comprises a third receptacle for receiving a second selection jaw and a fourth receptacle for receiving a second shifting jaw.

6. The jaw-type gearshift of claim 5, wherein the first receptacle comprises a first width that is several times greater than a second width of the second receptacle.

7. The jaw-type gearshift of claim 5, wherein the first receptacle is arranged on a larger diameter than the second receptacle, which is arranged on a smaller diameter.

8. The jaw-type gearshift of claim 5, wherein:
the first receptacle and the second receptacle are arranged in an adapter disc non-rotatably connected to the first gear wheel; and
the third receptacle and the fourth receptacle are arranged directly in the second gear wheel.

9. The jaw-type gearshift of claim 5, further comprising an adapter disc non-rotatably connected to the first gear wheel, wherein:
the first receptacle and the second receptacle are arranged in the adapter disc; and
the third receptacle and the fourth receptacle are arranged directly in the second gear wheel.

10. A method for shifting a jaw-type gearshift comprising:
providing a sliding sleeve having a selection jaw, a shifting gate having a shifting jaw and a sliding block guide, and a gear wheel with a first receptacle for the selection jaw and a second receptacle for the shifting jaw;
axially moving the sliding sleeve in a direction of the gear wheel until the selection jaw engages in the first receptacle;
pivoting the shifting gate about an angle relative to the sliding sleeve; and
axially moving the shifting gate by a slope of the sliding block guide in the direction of the gear wheel until the shifting jaw engages in the second receptacle.

11. The method of claim 10 wherein the sliding sleeve comprises a shifting finger disposed in the sliding block guide such that pivoting the shifting gate relative to the sliding sleeve axially moves the shifting gate.

12. A jaw-type gearshift for a gearbox comprising:
a gear shaft;
a sliding sleeve comprising:
a radially inwardly pointing shifting finger; and
a first selection jaw protruding from a first axial side of the sliding sleeve; and
a ring-shaped shifting gate comprising:
a sliding block guide in shifting contact with the radially inwardly pointing shifting finger; and
a first shifting jaw protruding from a first axial side of the ring-shaped shifting gate; and
a first gear wheel arranged on the gear shaft, comprising a first receptacle for receiving the first selection jaw and a second receptacle for receiving the first shifting jaw, wherein:
the sliding sleeve is axially displaceable relative to the gear shaft;
the ring-shaped shifting gate is arranged between the gear shaft and the sliding sleeve;
the ring-shaped shifting gate is pivotable about a shifting angle relative to the sliding sleeve.

13. The jaw-type gearshift of claim 12 further comprising a second gear wheel arranged on the gear shaft, wherein:
the sliding sleeve comprises a second selection jaw protruding from a second axial side of the sliding sleeve, opposite the first axial side;
the ring-shaped shifting gate comprises a second shifting jaw protruding from a second axial side of the shifting jaw, opposite the first axial side;
the second gear wheel comprises a third receptacle for receiving the second selection jaw and a further receptacle for receiving the second shifting jaw.

14. The jaw-type gearshift of claim 12, wherein the first receptacle comprises a first width that is several times greater than a second width of the second receptacle.

15. The jaw-type gearshift of claim 12, wherein the first receptacle is arranged on a larger diameter than the second receptacle, which is arranged on a smaller diameter.

* * * * *